United States Patent
Yang

(10) Patent No.: US 8,643,140 B2
(45) Date of Patent: Feb. 4, 2014

(54) SUSPENDED BEAM FOR USE IN MEMS DEVICE

(75) Inventor: Chin-Sheng Yang, Hsinchu (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 13/179,608

(22) Filed: Jul. 11, 2011

(65) Prior Publication Data

US 2013/0015556 A1   Jan. 17, 2013

(51) Int. Cl.
*H01L 21/02* (2006.01)

(52) U.S. Cl.
USPC ........... 257/532; 257/214; 257/414; 257/415; 438/125; 438/126; 438/127

(58) Field of Classification Search
USPC .............. 438/48–55, 125–127, 723; 257/532, 257/214, 421, 422, 414, 415
See application file for complete search history.

(56) References Cited

U.S. PATENT DOCUMENTS

| | | | | |
|---|---|---|---|---|
| 4,916,349 A | * | 4/1990 | Kornrumpf | 310/332 |
| 5,573,679 A | | 11/1996 | Mitchell | |
| 5,578,976 A | * | 11/1996 | Yao | 333/262 |
| 5,587,343 A | * | 12/1996 | Kano et al. | 438/52 |
| 5,595,942 A | * | 1/1997 | Albrecht et al. | 438/52 |
| 5,638,946 A | * | 6/1997 | Zavracky | 200/181 |
| 5,658,698 A | * | 8/1997 | Yagi et al. | 430/11 |
| 5,719,073 A | | 2/1998 | Shaw | |
| 5,777,328 A | * | 7/1998 | Gooch | 250/338.4 |
| 5,870,007 A | * | 2/1999 | Carr et al. | 333/262 |
| 5,914,507 A | * | 6/1999 | Polla et al. | 257/254 |
| 5,936,159 A | * | 8/1999 | Kano et al. | 73/514.36 |
| 6,016,693 A | * | 1/2000 | Viani et al. | 73/105 |
| 6,211,598 B1 | * | 4/2001 | Dhuler et al. | 310/307 |
| 6,243,474 B1 | | 6/2001 | Tai | |
| 6,265,328 B1 | | 7/2001 | Henley | |
| 6,384,353 B1 | * | 5/2002 | Huang et al. | 200/181 |
| 6,410,361 B2 | * | 6/2002 | Dhuler et al. | 438/54 |
| 6,504,118 B2 | * | 1/2003 | Hyman et al. | 200/181 |
| 6,635,509 B1 | | 10/2003 | Ouellet | |
| 6,725,719 B2 | | 4/2004 | Cardarelli | |
| 6,788,175 B1 | * | 9/2004 | Prophet | 335/78 |
| 6,800,503 B2 | * | 10/2004 | Kocis et al. | 438/52 |
| 6,806,593 B2 | | 10/2004 | Tai | |
| 6,829,131 B1 | | 12/2004 | Loeb | |
| 6,841,848 B2 | | 1/2005 | MacNamara | |
| 6,860,107 B2 | * | 3/2005 | Silverbrook | 60/527 |
| 6,872,902 B2 | | 3/2005 | Cohn | |
| 6,876,047 B2 | * | 4/2005 | Cunningham et al. | 257/415 |
| 6,887,391 B1 | | 5/2005 | Daneman | |
| 6,936,524 B2 | | 8/2005 | Zhu | |
| 6,943,448 B2 | | 9/2005 | Gabriel | |
| 6,946,728 B2 | | 9/2005 | Chen | |
| 6,962,832 B2 | * | 11/2005 | Chou | 438/52 |
| 6,991,953 B1 | * | 1/2006 | Bruner et al. | 438/29 |
| 7,007,990 B2 | * | 3/2006 | Van Damme et al. | 293/120 |
| 7,015,584 B2 | * | 3/2006 | Chow et al. | 257/773 |
| 7,019,955 B2 | | 3/2006 | Loeb | |

(Continued)

*Primary Examiner* — Alexander Sofocleous
*Assistant Examiner* — Ankush Singal
(74) *Attorney, Agent, or Firm* — Ding Yu Tan

(57) ABSTRACT

A suspended beam includes a substrate, a main body and a first metal line structure. A first end of the main body is fixed onto the substrate. A second end of the main body is suspended. The first metal line structure is embedded in the main body. The width of the first metal line structure is smaller than the width of the main body.

16 Claims, 6 Drawing Sheets

(56) References Cited

U.S. PATENT DOCUMENTS

| | | | |
|---|---|---|---|
| 7,026,697 B2* | 4/2006 | Sherrer | 257/415 |
| 7,045,459 B2 | 5/2006 | Freidhoff | |
| 7,049,051 B2 | 5/2006 | Gabriel | |
| 7,068,027 B1* | 6/2006 | Mastro et al. | 324/204 |
| 7,071,793 B2* | 7/2006 | Lutz et al. | 333/186 |
| 7,098,577 B2* | 8/2006 | Mehta | 310/332 |
| 7,129,172 B2 | 10/2006 | Morrow | |
| 7,152,474 B2 | 12/2006 | Deb | |
| 7,202,101 B2 | 4/2007 | Gabriel | |
| 7,215,066 B2* | 5/2007 | Kawakubo et al. | 310/348 |
| 7,237,315 B2* | 7/2007 | Kubena et al. | 29/594 |
| 7,242,569 B2 | 7/2007 | Hunt | |
| 7,248,221 B2* | 7/2007 | Kai et al. | 343/700 MS |
| 7,280,436 B2 | 10/2007 | Pedersen | |
| 7,288,424 B2 | 10/2007 | Hunter | |
| 7,329,933 B2 | 2/2008 | Zhe | |
| 7,343,655 B2* | 3/2008 | Mehta | 29/25.35 |
| 7,345,866 B1* | 3/2008 | Hsu et al. | 361/277 |
| 7,354,787 B2* | 4/2008 | Dunec et al. | 438/52 |
| 7,356,920 B2* | 4/2008 | Hantschel et al. | 29/841 |
| 7,362,197 B2* | 4/2008 | Lutz et al. | 333/186 |
| 7,405,638 B2* | 7/2008 | Sherrer et al. | 333/243 |
| 7,419,843 B2* | 9/2008 | Park et al. | 438/48 |
| 7,432,571 B2* | 10/2008 | Lee et al. | 257/414 |
| 7,471,184 B1* | 12/2008 | Aksyuk et al. | 337/1 |
| 7,498,911 B2* | 3/2009 | Forehand | 335/78 |
| 7,545,251 B2* | 6/2009 | McAvoy et al. | 337/111 |
| 7,550,855 B2* | 6/2009 | Hantschel et al. | 257/776 |
| 7,695,106 B2* | 4/2010 | Silverbrook | 347/47 |
| 7,728,395 B2* | 6/2010 | Yang et al. | 257/415 |
| 7,830,227 B1* | 11/2010 | Chang et al. | 333/133 |
| 7,858,422 B1* | 12/2010 | Quevy et al. | 438/52 |
| 7,887,233 B2* | 2/2011 | McAvoy et al. | 374/44 |
| 7,960,805 B2* | 6/2011 | Chen et al. | 257/415 |
| 7,977,137 B1* | 7/2011 | Ebel et al. | 438/53 |
| 8,043,950 B2* | 10/2011 | Yamaguchi et al. | 438/590 |
| 8,058,957 B2* | 11/2011 | Irion et al. | 333/262 |
| 8,087,757 B2* | 1/2012 | Silverbrook | 347/62 |
| 8,093,119 B2* | 1/2012 | Hsieh et al. | 438/199 |
| 8,138,008 B1* | 3/2012 | Hasselbach et al. | 438/52 |
| 8,138,495 B2* | 3/2012 | Watson | 257/17 |
| 8,183,650 B2* | 5/2012 | Wang et al. | 257/415 |
| 8,199,020 B1* | 6/2012 | Kim | 340/601 |
| 8,258,673 B2* | 9/2012 | Fujita et al. | 310/309 |
| 8,314,467 B1* | 11/2012 | Hammond et al. | 257/415 |
| 2001/0020878 A1* | 9/2001 | Speidell et al. | 333/197 |
| 2002/0050881 A1* | 5/2002 | Hyman et al. | 335/78 |
| 2002/0050882 A1* | 5/2002 | Hyman et al. | 335/78 |
| 2002/0164893 A1* | 11/2002 | Mathieu et al. | 439/66 |
| 2003/0010615 A1* | 1/2003 | Fork et al. | 200/262 |
| 2003/0036215 A1* | 2/2003 | Reid | 438/52 |
| 2003/0067047 A1* | 4/2003 | Sandoe et al. | 257/415 |
| 2003/0148550 A1* | 8/2003 | Volant et al. | 438/52 |
| 2004/0012061 A1* | 1/2004 | Reid et al. | 257/415 |
| 2004/0080562 A1* | 4/2004 | Silverbrook | 347/20 |
| 2004/0097003 A1* | 5/2004 | Kocis et al. | 438/52 |
| 2004/0122328 A1 | 6/2004 | Wang | |
| 2004/0155306 A1* | 8/2004 | Lee et al. | 257/414 |
| 2004/0164423 A1* | 8/2004 | Sherrer | 257/774 |
| 2005/0007219 A1* | 1/2005 | Ma et al. | 335/78 |
| 2005/0014317 A1 | 1/2005 | Pyo | |
| 2005/0076719 A1 | 4/2005 | Jakobsen | |
| 2005/0127499 A1* | 6/2005 | Harney et al. | 257/704 |
| 2005/0158905 A1* | 7/2005 | Kubena et al. | 438/48 |
| 2005/0162806 A1 | 7/2005 | Sarkar | |
| 2005/0221529 A1 | 10/2005 | Bang | |
| 2006/0055287 A1* | 3/2006 | Kawakubo et al. | 310/348 |
| 2006/0223329 A1 | 10/2006 | Martin | |
| 2006/0260401 A1 | 11/2006 | Xie | |
| 2006/0290236 A1* | 12/2006 | Ikehashi | 310/330 |
| 2007/0003082 A1 | 1/2007 | Pedersen | |
| 2007/0007858 A1 | 1/2007 | Sorensen | |
| 2007/0023851 A1* | 2/2007 | Hartzell et al. | 257/414 |
| 2007/0024410 A1* | 2/2007 | Yazdi | 338/13 |
| 2007/0040270 A1 | 2/2007 | Coenen | |
| 2007/0047900 A1 | 3/2007 | Sampsell | |
| 2007/0054205 A1 | 3/2007 | Lin | |
| 2007/0065967 A1 | 3/2007 | Beaudry | |
| 2007/0080134 A1* | 4/2007 | Silverbrook | 216/27 |
| 2007/0092180 A1* | 4/2007 | Hashimura et al. | 385/16 |
| 2007/0119252 A1* | 5/2007 | Adams et al. | 73/510 |
| 2007/0125161 A1 | 6/2007 | Bryzek | |
| 2007/0146095 A1* | 6/2007 | Chou et al. | 333/105 |
| 2007/0187793 A1 | 8/2007 | Moon | |
| 2007/0209437 A1* | 9/2007 | Xue et al. | 73/514.31 |
| 2007/0278600 A1* | 12/2007 | Zhan et al. | 257/415 |
| 2007/0284682 A1 | 12/2007 | Laming | |
| 2008/0003710 A1* | 1/2008 | Kogut et al. | 438/52 |
| 2008/0089211 A1* | 4/2008 | Chu et al. | 369/126 |
| 2008/0094686 A1 | 4/2008 | U'Ren | |
| 2008/0137884 A1 | 6/2008 | Kim | |
| 2008/0163687 A1 | 7/2008 | Kranz | |
| 2008/0169521 A1* | 7/2008 | Foster et al. | 257/415 |
| 2008/0173960 A1* | 7/2008 | Kotovsky | 257/419 |
| 2008/0224319 A1* | 9/2008 | Nakamura | 257/758 |
| 2008/0304681 A1 | 12/2008 | Langlois | |
| 2009/0027763 A1* | 1/2009 | Zhang et al. | 359/320 |
| 2009/0166772 A1* | 7/2009 | Hsieh et al. | 257/415 |
| 2009/0180655 A1 | 7/2009 | Tien | |
| 2009/0195608 A1* | 8/2009 | Silverbrook | 347/47 |
| 2009/0219104 A1* | 9/2009 | Van Beek et al. | 331/154 |
| 2009/0243004 A1 | 10/2009 | Lan | |
| 2010/0002894 A1 | 1/2010 | Lan | |
| 2010/0019872 A1* | 1/2010 | Bozler et al. | 333/248 |
| 2010/0052179 A1 | 3/2010 | Lan | |
| 2010/0067728 A1 | 3/2010 | Chen | |
| 2010/0068854 A1* | 3/2010 | Schirmer et al. | 438/125 |
| 2010/0074458 A1 | 3/2010 | Lan | |
| 2010/0084735 A1 | 4/2010 | Yang | |
| 2010/0090298 A1 | 4/2010 | Shih | |
| 2010/0093125 A1* | 4/2010 | Quevy et al. | 438/50 |
| 2010/0141362 A1* | 6/2010 | Lee et al. | 333/262 |
| 2010/0144156 A1 | 6/2010 | Shih | |
| 2010/0270628 A1 | 10/2010 | Shih | |
| 2010/0295138 A1* | 11/2010 | Montanya Silvestre et al. | 257/415 |
| 2011/0006350 A1 | 1/2011 | Shih | |
| 2011/0012227 A1 | 1/2011 | Yang | |
| 2011/0031624 A1* | 2/2011 | Lan et al. | 257/753 |
| 2011/0068422 A1* | 3/2011 | Quevy et al. | 257/416 |
| 2011/0084781 A1* | 4/2011 | Quevy et al. | 333/200 |
| 2011/0163397 A1* | 7/2011 | Detor et al. | 257/415 |
| 2011/0233693 A1* | 9/2011 | Perruchot et al. | 257/417 |
| 2011/0318861 A1* | 12/2011 | Jahnes et al. | 438/52 |
| 2012/0098136 A1* | 4/2012 | Lindgren et al. | 257/770 |
| 2013/0156993 A1* | 6/2013 | Czabaj et al. | 428/76 |

* cited by examiner

SUSPENDED BEAM FOR USE IN MEMS DEVICE

FIELD OF THE INVENTION

The present invention relates to a suspended beam, and more particularly to a suspended beam for use in a microelectromechanical systems (MEMS) device.

BACKGROUND OF THE INVENTION

A microelectromechanical systems (MEMS) device is an electronic device that integrates mechanical elements, sensors and electronics on a silicon substrate through the utilization of a semiconductor manufacturing process. FIG. 1 is a schematic top view illustrating a suspended beam used in a MEMS device according to the prior art. As shown in FIG. 1, a first end 101 of the suspended beam 10 is fixed onto the silicon substrate 1, and a second end 100 of the suspended beam 10 is suspended. The suspended beam can be widely applied to a variety of sensors. For example, a variable capacitor may be simply formed by adjusting the distance between two adjacent suspended beams. In such way, the MEMS sensor (e.g. an accelerometer) will be further fabricated. However, the current suspended beam is not suitably integrated into a control circuit chip. Therefore, there is a need of providing an improved suspended beam to obviate the drawbacks encountered from the prior art.

SUMMARY OF THE INVENTION

In accordance with an aspect, the present invention provides a suspended beam. The suspended beam includes a substrate, a main body and a first metal line structure. A first end of the main body is fixed onto the substrate. A second end of the main body is suspended. The first metal line structure is embedded in the main body. The width of the first metal line structure is smaller than the width of the main body.

In an embodiment, the substrate is a silicon substrate.

In an embodiment, the main body is constituted by a dielectric layer or a multi-layered structure including two or more dielectric layers.

In an embodiment, the dielectric layer is made of silicon oxide.

In an embodiment, the first metal line structure is partially embedded in a top surface of the main body and exposed outside the main body.

In an embodiment, the first metal line structure is embedded in a periphery of a top surface of the main body and exposed outside the main body.

In an embodiment, the first metal line structure is embedded within the main body and not exposed to the main body.

In an embodiment, the suspended beam further includes a second metal line structure. The second metal line structure is embedded in the main body, and electrically connected with the first metal line structure through at least one contact hole conductor.

In accordance with another aspect, the present invention provides a circuit chip. The circuit chip includes a substrate, an integrated circuit device and a microelectromechanical systems (MEMS) zone. The integrated circuit device is formed over the substrate, and includes a multi-layered structure. The microelectromechanical systems (MEMS) zone is formed over the substrate, and at least includes a suspended beam. The suspended beam includes a main body and a first metal line structure. A first end of the main body is fixed onto the substrate. A second end of the main body is suspended. A first metal line structure is embedded in the main body. The width of the first metal line structure is smaller than the width of the main body.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
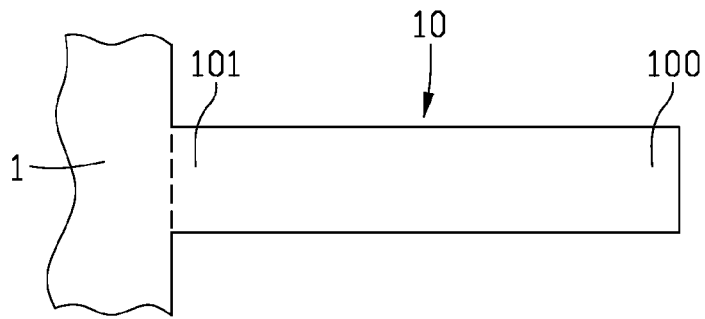
FIG. 1 is a schematic top view illustrating a suspended beam used in a MEMS device according to the prior art.
Figure 2A:
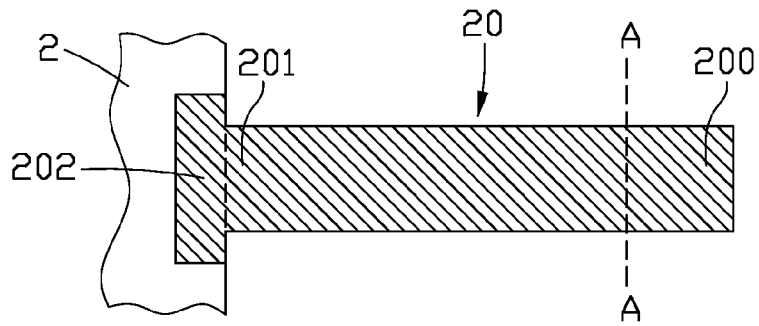
FIG. 2A is a schematic top view illustrating a suspended beam used in a MEMS device.

FIG. 2A is a schematic top view illustrating a suspended beam used in a MEMS device. As shown in FIG. 2A, a first end 201 of the suspended beam 20 is fixed onto the silicon substrate 2, and a second end 200 of the suspended beam 20 is suspended. The top surfaces of the suspended beam 20 and the silicon substrate 2 are covered by a metal layer 202. The metal layer 202 may be used as an electrode plate of a capacitor.

Figure 2B:
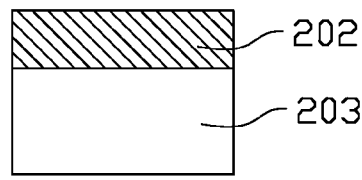
FIG. 2B is a schematic cross-sectional view illustrating an exemplary suspended beam of FIG. 2A and taken along the line AA.
Figure 2C:
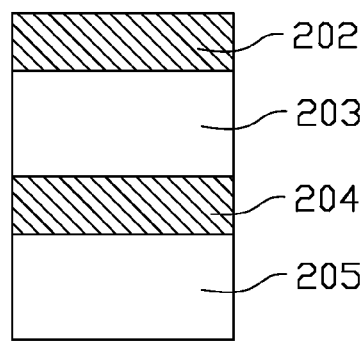
FIG. 2C is a schematic cross-sectional view illustrating another exemplary suspended beam of FIG. 2A and taken along the line AA.

FIG. 2B is a schematic cross-sectional view illustrating an exemplary suspended beam of FIG. 2A and taken along the line AA. FIG. 2C is a schematic cross-sectional view illustrating another exemplary suspended beam of FIG. 2A and taken along the line AA. As shown in FIG. 2B, the suspended beam 20 is a two-layered structure including a dielectric layer 203 and a metal layer 202. As shown in FIG. 2C, the suspended beam 20 is a four-layered structure including two dielectric layers 203, 205 and two metal layers 202, 204. Moreover, the silicon substrate under the suspended beam 20 is removed by an etching process, so that the suspended beam 20 is suspended. Since the suspended beam 20 of this embodiment is constituted by stacking one or more dielectric layers and one or more metal layers, the simple configuration is helpful to integrate the suspended beam 20 into the general integrated circuit chips. However, since the material difference between the dielectric layer and the metal layer is too large, the subsequent high-temperature process may result in bending of the metal layer. Under this circumstance, the suspended beam 20 may be suffered from unexpected deformation. Due to the unexpected deformation of the suspended beam 20, the finished sensor fails to be normally operated.

Figure 3A:
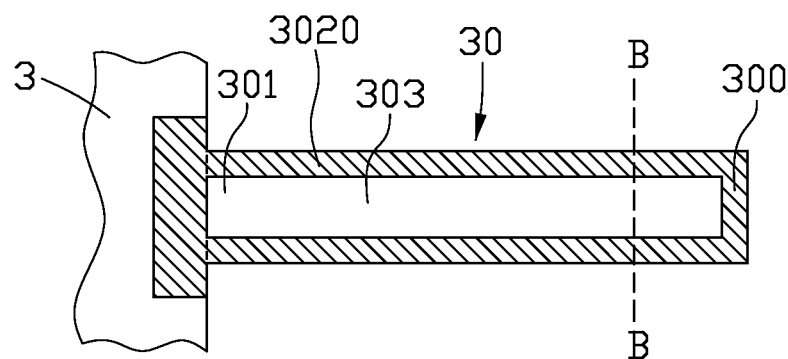
FIG. 3A is a schematic top view illustrating a suspended beam according to an embodiment of the present invention.

For solving the above drawbacks, the suspended beam needs to be further improved. FIG. 3A is a schematic top view illustrating a suspended beam according to an embodiment of the present invention. As shown in FIG. 3A, a first end 301 of the suspended beam 30 is fixed onto the silicon substrate 3, and a second end 300 of the suspended beam 30 is suspended. Moreover, the silicon substrate under the second end 300 of the suspended beam 30 is removed by an etching process, so that the second end 300 of the suspended beam 30 is suspended. In this embodiment, the top surface of the suspended beam 30 is not completely covered by a metal layer. Whereas, the top surface of the suspended beam 30 is enclosed by a metal line structure 3020. The metal line structure 3020 may be used as an electrode plate of a capacitor.

Figure 3B:
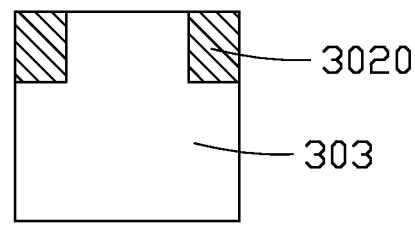
FIG. 3B is a schematic cross-sectional view illustrating an exemplary suspended beam of FIG. 3A and taken along the line BB.

FIG. 3B is a schematic cross-sectional view illustrating an exemplary suspended beam of FIG. 3A and taken along the line BB. As shown in FIG. 3B, the main body of the suspended beam 30 is implemented by a dielectric layer 303, and the metal line structure 3020 is a metal layer embedded in the dielectric layer 303. In comparison with the suspended beam of FIGS. 2A and 2B, the periphery of the top surface of the suspended beam 30 in this embodiment is enclosed by only the metal line structure 3020. Since the bending degree of the metal line structure 3020 resulting from the subsequent high-temperature process is largely reduced, the possibility of causing deformation of the suspended beam 30 will be minimized.

Figure 3C:
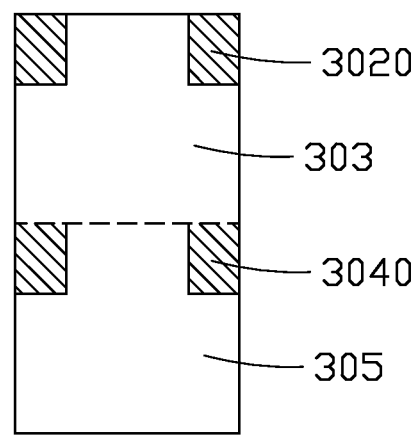
FIG. 3C is a schematic cross-sectional view illustrating another exemplary suspended beam of FIG. 3A and taken along the line BB.
Figure 3D:
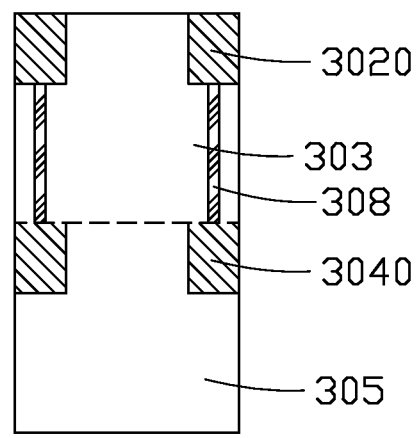
FIG. 3D is a schematic cross-sectional view illustrating a further exemplary suspended beam of FIG. 3A and taken along the line BB.

FIG. 3C is a schematic cross-sectional view illustrating another exemplary suspended beam of FIG. 3A and taken along the line BB. FIG. 3D is a schematic cross-sectional view illustrating a further exemplary suspended beam of FIG. 3A and taken along the line BB. As shown in FIG. 3C, the suspended beam 30 comprises two dielectric layers 303, 305 and two metal layers 3020, 3040. The dielectric layer 303 is formed on the dielectric layer 305. The periphery of the top surface of the dielectric layer 303 is enclosed by the metal layer 3020. The periphery of the top surface of the dielectric layer 305 is enclosed by the metal layer 3040. Except that the metal layers 3020 and 3040 are connected with each other through a contact hole conductor 308, the configuration of the suspended beam 30 of FIG. 3D is substantially similar to that of the suspended beam 30 of FIG. 3C. It is noted that the suspended beam 30 may comprise more than two dielectric layers and more than two metal layers.

Figure 4A:
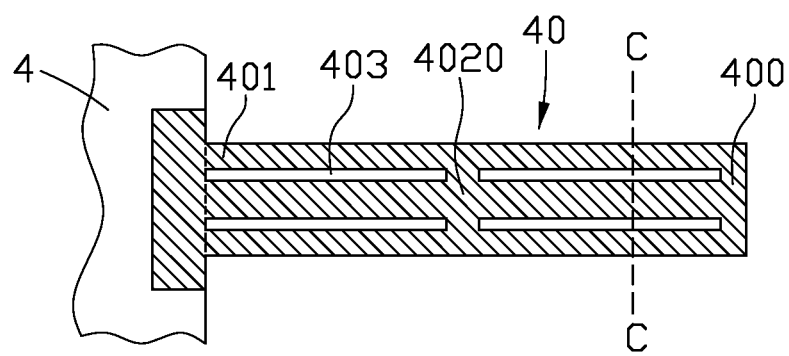
FIG. 4A is a schematic top view illustrating a suspended beam according to another embodiment of the present invention.

FIG. 4A is a schematic top view illustrating a suspended beam according to a third embodiment of the present invention. As shown in FIG. 4A, a first end 401 of the suspended beam 40 is fixed onto the silicon substrate 4, and a second end 400 of the suspended beam 40 is suspended. In this embodiment, the top surface of the suspended beam 40 is not completely covered by a metal layer. Whereas, the top surface of the suspended beam 40 is partially covered by a metal line structure 4020. The metal line structure 4020 may be used as an electrode plate of a capacitor.

Figure 4B:
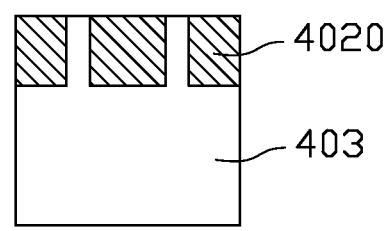
FIG. 4B is a schematic cross-sectional view illustrating an exemplary suspended beam of FIG. 4A and taken along the line CC.

FIG. 4B is a schematic cross-sectional view illustrating an exemplary suspended beam of FIG. 4A and taken along the line CC. As shown in FIG. 4B, the main body of the suspended beam 40 is implemented by a dielectric layer 403, and the metal line structure 4020 is a metal layer embedded in the dielectric layer 403. In comparison with the suspended beam of FIGS. 2A and 2B, the metal line structure 4020 is partially embedded in the top surface of the dielectric layer 403 and the periphery of the top surface of the dielectric layer 403 is enclosed by the metal line structure 4020. That is, the width of the metal line structure 4020 is smaller than the width of the main body of the suspended beam 40. Since the bending degree of the metal line structure 4020 resulting from the subsequent high-temperature process is largely reduced, the possibility of causing deformation of the suspended beam 40 will be minimized.

Figure 4C:
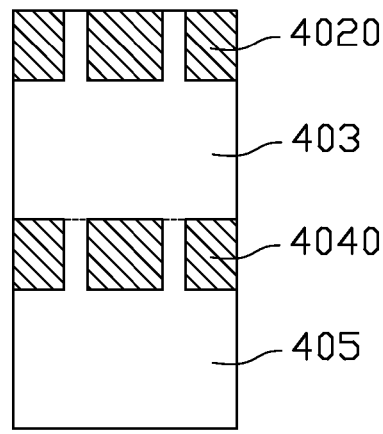
FIG. 4C is a schematic cross-sectional view illustrating another exemplary suspended beam of FIG. 4A and taken along the line CC.
Figure 4D:
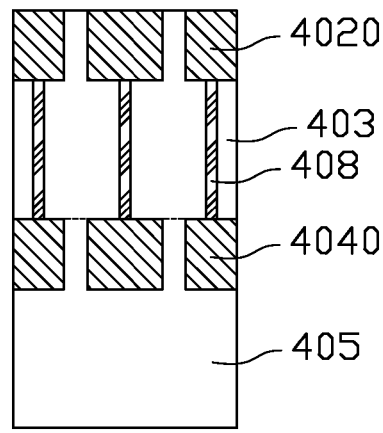
FIG. 4D is a schematic cross-sectional view illustrating a further exemplary suspended beam of FIG. 4A and taken along the line CC.

FIG. 4C is a schematic cross-sectional view illustrating another exemplary suspended beam of FIG. 4A and taken along the line CC. FIG. 4D is a schematic cross-sectional view illustrating a further exemplary suspended beam of FIG. 4A and taken along the line CC. As shown in FIG. 4C, the suspended beam 40 comprises two dielectric layers 403, 405 and two metal layers 4020, 4040. The dielectric layer 403 is formed on the dielectric layer 405. The metal line structure 4020 is partially embedded in the top surface of the dielectric layer 403 and the periphery of the top surface of the dielectric layer 403 is enclosed by the metal line structure 4020. The metal line structure 4040 is partially embedded in the top surface of the dielectric layer 404 and the periphery of the top surface of the dielectric layer 404 is enclosed by the metal line structure 4040. Except that the metal layers 4020 and 4040 are connected with each other through a contact hole conductor 408, the configuration of the suspended beam 40 of FIG. 4D is substantially similar to that of the suspended beam 40 of FIG. 4C. It is noted that the suspended beam 40 may comprise more than two dielectric layers and more than two metal layers.

Figure 5A:
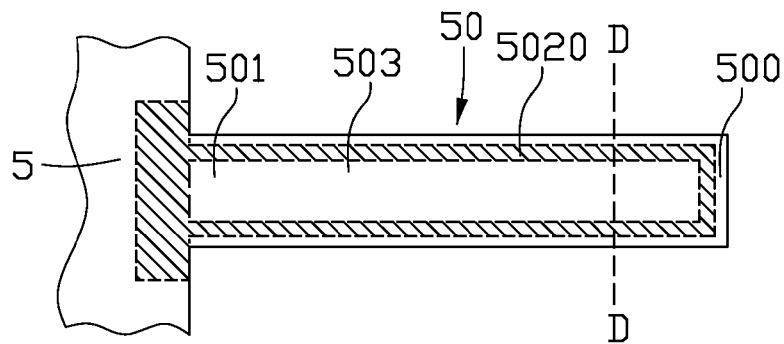
FIG. 5A is a schematic top view illustrating a suspended beam according to a further embodiment of the present invention.

FIG. 5A is a schematic top view illustrating a suspended beam according to a fourth embodiment of the present invention. As shown in FIG. 5A, a first end 501 of the suspended beam 50 is fixed onto the silicon substrate 5, and a second end 500 of the suspended beam 50 is suspended. In this embodiment, the top surface of the suspended beam 50 is not completely covered by a metal layer or a metal line structure. Whereas, a metal line structure 5020 to be served as an electrode plate of a capacitor is embedded within the dielectric layer 503 (i.e. the main body of the suspended beam 50). That is, the metal line structure 5020 is not exposed outside the dielectric layer 503.

Figure 5B:
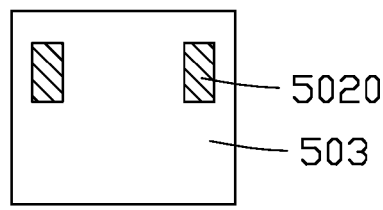
FIG. 5B is a schematic cross-sectional view illustrating an exemplary suspended beam of FIG. 5A and taken along the line DD.

FIG. 5B is a schematic cross-sectional view illustrating an exemplary suspended beam of FIG. 5A and taken along the line DD. As shown in FIG. 5B, the main body of the suspended beam 50 is implemented by a dielectric layer 503, and the metal line structure 5020 is a metal layer embedded within the dielectric layer 503 and not exposed outside the dielectric layer 503. In comparison with the suspended beam of FIGS. 2A and 2B, the metal line structure 5020 is embedded within the dielectric layer 503. That is, the width of the metal line structure 5020 is smaller than the width of the main body of the suspended beam 50. Since the bending degree of the metal line structure 5020 resulting from the subsequent high-temperature process is largely reduced, the possibility of causing deformation of the suspended beam 50 will be minimized.

Figure 5C:
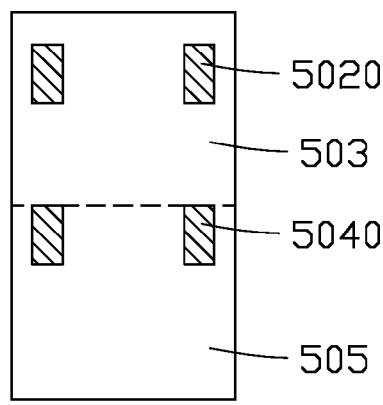
FIG. 5C is a schematic cross-sectional view illustrating another exemplary suspended beam of FIG. 5A and taken along the line DD.
Figure 5D:
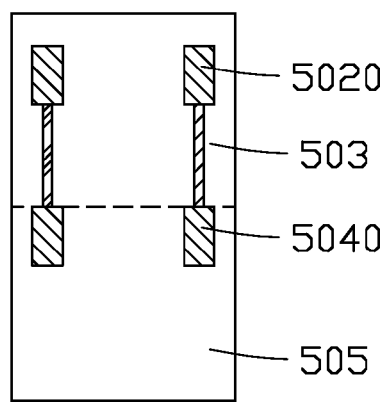
FIG. 5D is a schematic cross-sectional view illustrating a further exemplary suspended beam of FIG. 5A and taken along the line DD.

FIG. 5C is a schematic cross-sectional view illustrating another exemplary suspended beam of FIG. 5A and taken along the line DD. FIG. 5D is a schematic cross-sectional view illustrating a further exemplary suspended beam of FIG. 5A and taken along the line DD. As shown in FIG. 5C, the suspended beam 50 comprises two dielectric layers 503, 505 and two metal layers 5020, 5040. The metal line structure 5020 is embedded within the dielectric layer 503. The metal line structure 5040 is embedded within the dielectric layer 504. Except that the metal layers 5020 and 5040 are connected with each other through a contact hole conductor 508, the configuration of the suspended beam 50 of FIG. 5D is substantially similar to that of the suspended beam 50 of FIG. 5C. It is noted that the suspended beam 50 may comprise more than two dielectric layers and more than two metal layers.

Figure 6:
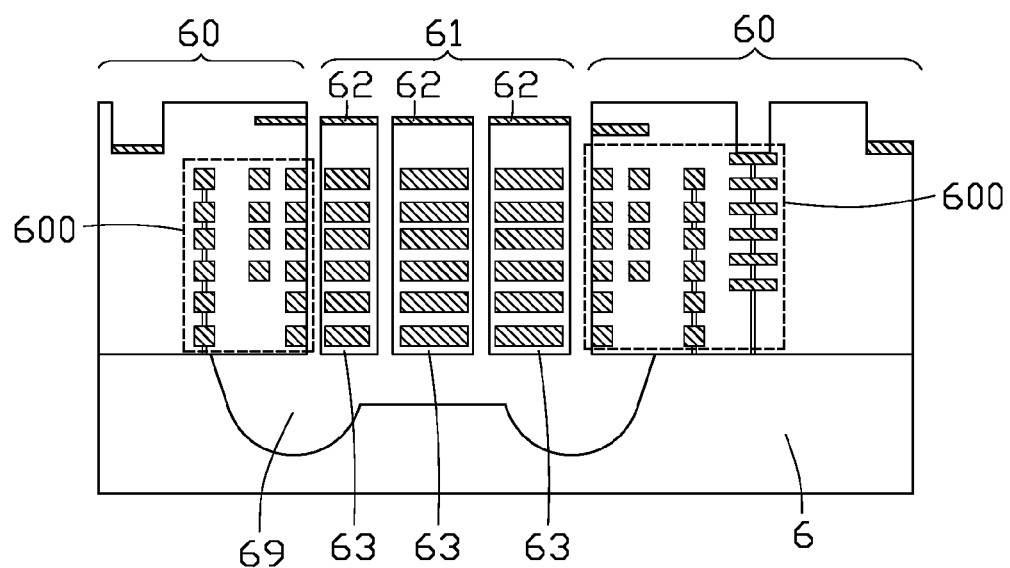
FIG. 6 is a schematic cross-sectional view illustrating a suspended beam integrated into an integrated circuit chip according to an embodiment of the present invention.

FIG. 6 is a schematic cross-sectional view illustrating a suspended beam integrated into an integrated circuit chip according to an embodiment of the present invention. As shown in FIG. 6, an integrated circuit device 60 is also formed over the silicon substrate. The integrated circuit device 60 comprises a multi-layered structure 600 including a plurality of dielectric layers and a plurality of metal interconnect layers, wherein the dielectric layers and the interconnect layers are alternately stacked on each other. Moreover, during the process of producing the multi-layered structure 600 from bottom to top, the metal damascene structures described in the above embodiments may be simultaneously formed in a MEMS zone 61. Then, an etch window defined by a hard mask 62 is employed, and an etching process is performed to remove the silicon substrate 6 underlying the metal damascene structures. After the silicon substrate 6 underlying the metal damascene structures is removed, two or more parallel suspended beams 63 are formed. An example of the hard mask 62 is a metal mask because of its good resistivity. Moreover, the topmost metal interconnect layer of the multi-layered structure 600 may be served as the hard mask 62. After the suspended beams 63 are formed, the hard mask 62 is nearly exhausted or slightly retained. Under this circumstance, the resulting structure of FIG. 6 is no longer adversely affected by the hard mask 62. In other words, the residual hard mask 62 may be kept unchanged or further stripped off.

In the above embodiments, the dielectric layer is made of silicon oxide, and the metal layer or the metal line structure is made of metallic material (e.g. copper, aluminum or tungsten) or a metallic alloy.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A suspended beam, comprising:
   a substrate;
   a main body, wherein a first end of the main body is fixed onto the substrate, and a second end of the main body is suspended; and
   a first metal line structure embedded in the main body and enclosing a portion of the main body, wherein the first metal line structure has a width smaller than a width of the main body.

2. The suspended beam according to claim 1, wherein the substrate is a silicon substrate.

3. The suspended beam according to claim 1, wherein the main body is constituted by a dielectric layer or a multi-layered structure including two or more dielectric layers.

4. The suspended beam according to claim 3, wherein the dielectric layer is made of silicon oxide.

5. The suspended beam according to claim 1, wherein the first metal line structure is embedded in a periphery of a top surface of the main body and exposed outside the main body.

6. The suspended beam according to claim 1, further comprising a second metal line structure, wherein the second metal line structure is embedded in the main body, and electrically connected with the first metal line structure through at least one contact hole conductor.

7. The suspended beam according to claim 1, wherein the first metal line structure is embedded within the main body and not exposed to the main body.

8. The suspended beam according to claim 1, wherein the first metal line structure encloses the portion of the main body with a substantially identical width thereof vertical to a direction extended by the first metal line structure.

9. A circuit chip, comprising:
   a substrate;
   an integrated circuit device formed over the substrate, and comprising a multi-layered structure; and
   a microelectromechanical systems (MEMS) zone formed over the substrate, and at least comprising a suspended beam, wherein the suspended beam comprises:
   a main body, wherein a first end of the main body is fixed onto the substrate, and a second end of the main body is suspended; and
   a first metal line structure embedded in the main body and enclosing a portion of the main body, wherein the width of the first metal line structure is smaller than a width of the main body.

10. The circuit chip according to claim 9, wherein the main body of the suspended beam is constituted by a dielectric layer or a multi-layered structure including two or more dielectric layers.

11. The circuit chip according to claim 9, wherein the first metal line structure is embedded in a periphery of a top surface of the main body and exposed outside the main body.

12. The circuit chip according to claim 9, further comprising a second metal line structure, wherein the second metal line structure is embedded in the main body, and electrically connected with the first metal line structure through at least one contact hole conductor.

13. The circuit chip according to claim 9, wherein the suspended beam is a part of a capacitor.

14. The circuit chip according to claim 9, wherein the first metal line structure is made of copper, aluminum or tungsten.

15. The circuit chip according to claim 9, wherein the first metal line structure is embedded within the main body and not exposed to the main body.

16. The circuit chip according to claim 9, wherein the first metal line structure encloses the portion of the main body with a substantially identical width vertical to a direction extended by the first metal line structure.

* * * * *